July 17, 1956 R. E. RISLEY 2,755,109
LOCK COUPLING FOR PIPE
Filed June 15, 1953 2 Sheets-Sheet 2
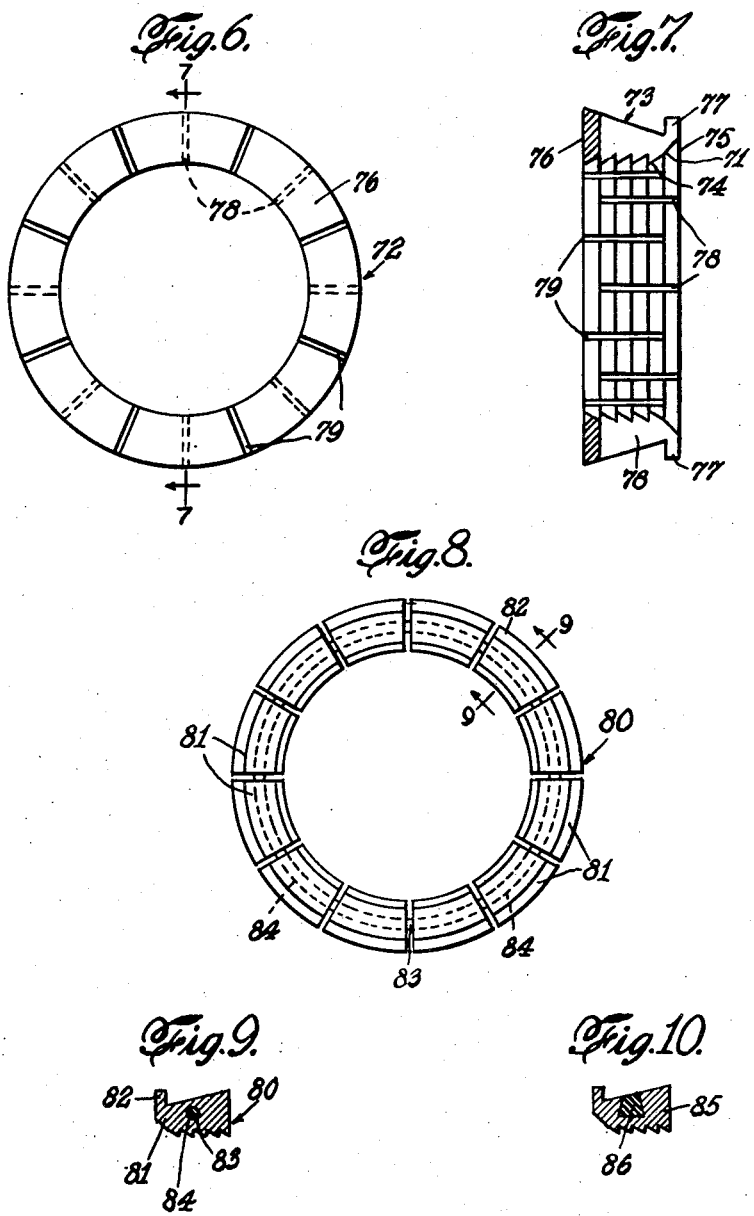
INVENTOR.
ROGER E. RISLEY

United States Patent Office 2,755,109
Patented July 17, 1956

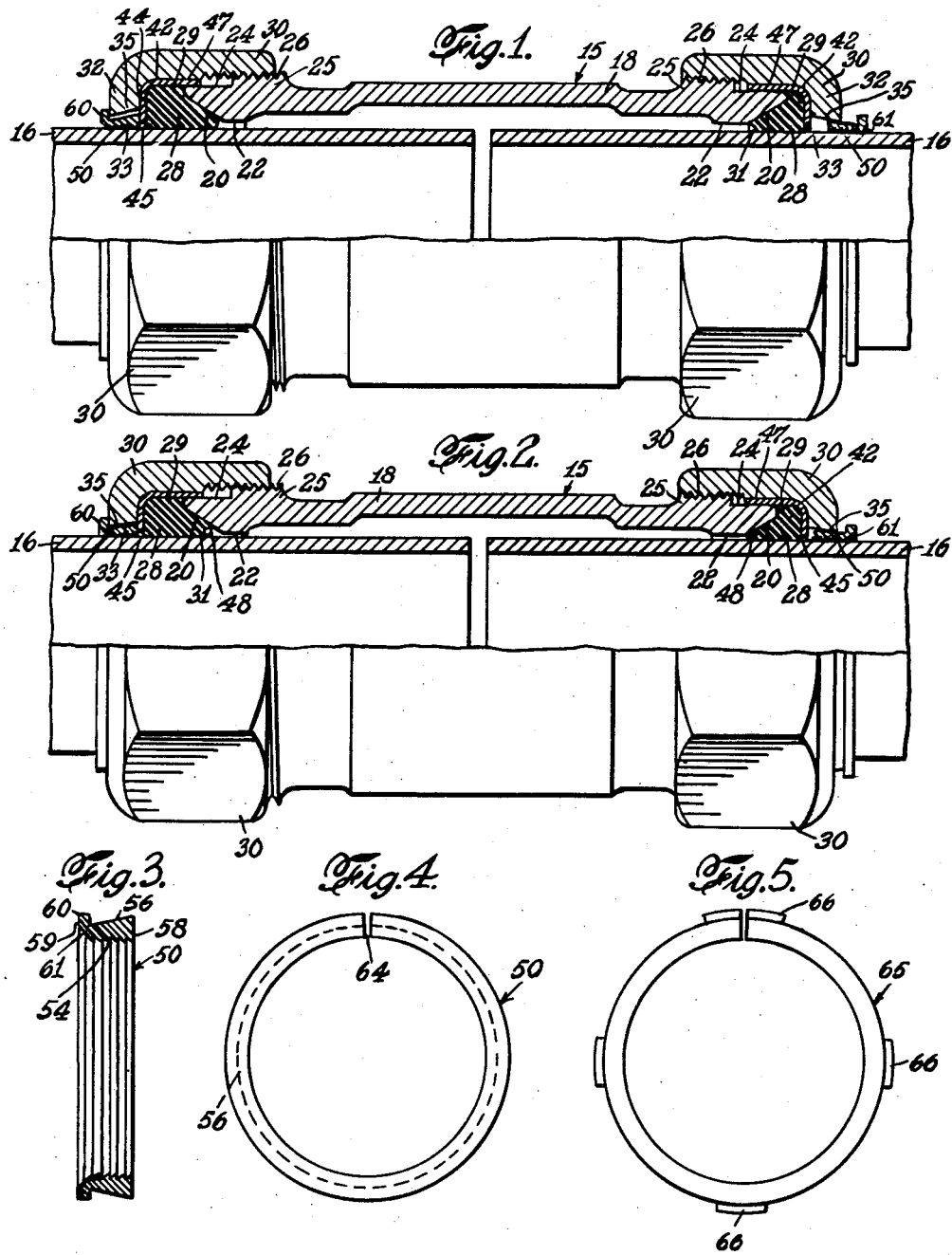

2,755,109
LOCK COUPLING FOR PIPE

Roger E. Risley, Bradford, Pa., assignor to Dresser Industries, Inc., Dallas, Tex., a corporation of Pennsylvania Application June 15, 1953, Serial No. 361,690

1 Claim. (Cl. 285—232)

This invention relates to couplings for pipe, tubing and the like, hereinafter referred to generally as "pipe," and is more particularly concerned with couplings which are effective for connecting sections of unthreaded pipe in flexible fluid-tight relationship while simultaneously withstanding longitudinal stress and preventing undesired outward axial displacement of the pipe sections.

In vertical pipe arrangements such, for example, as are employed in water wells and the like, which in many cases may be as much as 300 feet in depth and commonly are at least 100 to 150 feet deep, the couplings between the several sections of pipe which are necessary for making up a pipe line of sufficient length for such installations, must not only provide a fluid-tight joint between successive sections but must also resist the longitudinal stresses exerted by the weight of the pipe sections if undesired withdrawal of the pipes from the coupling is to be prevented. The heavier the pipe, the greater the longitudinal stress. Heretofore, for lack of more effective means, it has been common practice to join the pipe sections in such vertical pipe lines by means of ordinary screw couplings. Such couplings required the use of carefully threaded pipe and provide a rigid, non-yielding connection. It is common knowledge that threading a pipe weakens the pipe wall by appreciably reducing the wall thickness along the threaded portion. It has therefore been necessary to use rather heavy pipe so that the pipe walls will have sufficient strength notwithstanding the threads. Furthermore, in order to obtain a fluid-tight connection, it is necessary that the threads be very accurately cut, which greatly adds to the time and cost of making the installation. The rigidity of the connection obtained with a screw coupling, moreover, is a disadvantage in long vertical pipe installations of this type since vibrations and flexing forces cause an undue stress on the threaded connection.

In order to avoid the aforementioned disadvantages of screw couplings and, in addition, in order to facilitate the assembly of the pipe lines it has been proposed to use so-called compression type couplings. This type of coupling eliminates the necessity for threading the pipe and greatly reduces the time required for assembly. In connecting pipe sections with a compression type coupling, the ends of the sections are "stabbed" into the coupling and then the gasket compressing means is tightened to squeeze the gaskets into sealing engagement with outer surface of the pipes. The ordinary compression coupling of the type commonly used in the installation of horizontal pipe lines depends for its effectiveness upon the frictional engagement between the gaskets and the outside walls of the pipe sections. In vertical installations, however, where the weight of the line must be taken into account, this frictional engagement exerted by the gasket, while it provides a fluid-tight seal, is generally not adequate to withstand the longitudinal stresses continuously exerted by the line and, as a result, excess outward axial movement of the pipe in the couplings occurs. The various compression type couplings heretofore proposed for vertical installations have, therefore, embodied means of one kind or another to withstand such longitudinal stresses. Such prior proposals have, however, not been entirely satisfactory since efforts to provide the necessary resistance to longitudinal stress have generally resulted in lessening the effectiveness of the gasket seal.

Some of the proposed prior constructions have, for example, been based on a locking arrangement in which the lock is frequently actuated during installation before the gaskets have been fully compressed, using the procedure normally followed in the installation of a coupling of this type. In other prior constructions, the locking elements, e. g. balls, have been of a type which are brought into locking engagement upon outward movement of the pipe sections from the coupling sleeve. In these couplings, however, the lock is sometimes not properly actuated or excessive outward movement of the pipes is necessary, and the most common disadvantage of this arrangement is that the sealing pressure of the gaskets is adversely affected during the movement of the locking elements into locking engagement. In some cases the seal is destroyed and leaking of the pipe line results.

Furthermore, many of the heretofore proposed lock couplings have involved relatively complicated constructions which make them difficult and expensive to manufacture as well as difficult to install properly, even by highly-skilled labor.

It is an object of the present invention to provide a compression type coupling for use in vertical pipe installations, and in other installations in which strong longitudinal stresses are encountered, which avoids the disadvantages and shortcomings of prior couplings designed for such use.

It is another object of the invention to provide a coupling of the character indicated wherein actuation of the locking means does not adversely affect the sealing action of the gaskets and the gaskets remain under full sealing compression.

It is a further object of the invention to provide an improved locking means for compression type couplings.

It is another object of the invention to provide a gasket and locking means construction for compression type couplings which insures full gasket compression during actuation of the locking means.

It is still another object of the invention to provide a lock coupling wherein compression of the gasket may be effected to any desired degree without interfering in any way with the action of the locking means.

It is a further object of the invention to provide a compression coupling of the locking type wherein the locking means are automatically adjustable to insure proper actuation.

It is another object of the invention to provide a locking compression coupling for vertical pipe installations and the like which is of relatively simple construction, economical to manufacture, and easily and effectively installed even by unskilled labor.

In accordance with the invention, there is provided a coupling comprising a central tubular sleeve or "middle ring" having externally threaded ends each of which is adapted to receive a follower nut which is formed with an inwardly-tapered pipe-receiving opening, radially-adjustable locking means having a tapered outer peripheral surface of substantially the same slope as the tapered opening of the follower nut, a serrated pipe-engaging inner peripheral surface, and setting means for insuring optimum cooperative relationship with the follower nut, compressible gasket sealing means for providing a fluid-tight seal between the middle ring and the pipe sections being coupled, and gasket retainer means for transmitting the gasket-compressing force of the follower nut to permit simultaneous compression of the gaskets and actuation of the locking means.

It is a feature of the invention that the locking cam rings permit full gasket pressure and full locking action to occur simultaneously.

It is another feature of the invention that the locking rings may be brought into fully effective locking action regardless of the gasket pressure and without adverse effect upon the sealing action of the gaskets.

It is a further feature of the invention that the coupling can be installed rapidly and by unskilled labor without danger of improper or ineffective operation when in service in the pipe line.

Other objects and features of the invention will be apparent from the following detailed description of illustrative embodiments of the coupling of the invention and from the accompanying drawings wherein, Fig. 1 is a longitudinal sectional view, partly in elevation of a lock coupling embodying features of the present invention, showing the coupling at the time of installation upon a pair of co-linear pipe sections;

Fig. 2 is a similar view of the coupling illustrated in Fig. 1 but showing a slightly modified relationship of parts;

Fig. 3 is a cross-sectional view of the locking ring shown in Fig. 1;

Fig. 4 is an end elevational view of the locking ring shown in Fig. 3;

Fig. 5 is an end elevational view of a modified form of locking ring;

Fig. 6 is a similar view of another modified form of locking ring adapted for use in the lock coupling of the invention;

Fig. 7 is a sectional view taken approximately along the line 7—7 of Fig. 6;

Fig. 8 is an end elevational view of another embodiment of the locking ring;

Fig. 9 is a sectional view of the locking ring shown in Fig. 8 and taken approximately along the line 9—9 of Fig. 8; and Fig. 10 is a similar sectional view of another modified form of locking ring.

Referring to the drawings, and more particularly to Figs. 1 and 2, the reference numeral 15 designates generally the locking coupling illustrated, which is shown in position around the opposed ends of pipe sections 16. Coupling 15 comprises a tubular central sleeve or "middle ring" 18 which has its free ends internally tapered to provide gasket recesses 20 which extend inwardly of the sleeve to define pipe apertures 22 through which the two pipe sections 16 are received. The outer surface of each end of the sleeve 18 has a smooth cylindrical portion 24 which extends from the free outer edge to an annular section 25 of greater diameter which is externally threaded as indicated at 26. To facilitate the description and understanding of the structure of coupling 15, reference will be made below to one end only of the coupling, but since the coupling is symmetrical it will be understood that the other end is of the same construction.

Disposed in the gasket recess 20 is a gasket 28 which is suitably annular in form and is shaped to conform to the outline of the gasket recess 20 and the adjacent portions of the coupling. Thus, as shown in Figs. 1 and 2, gasket 28 has a main body portion 29 and a toe portion 31 which is substantially triangular in cross-section, gradually decreasing in thickness as the pipe aperture 22 is approached.

The gasket 28 is formed from rubber or rubber composition, this term being used generically to include natural and synthetic rubbers and other elastomeric compounds, or compositions having like properties and characteristics. The material is relatively firm and solid but sufficiently resilient and elastic to flow under pressure to conform to the surfaces between which it is confined. Advantageously, the gasket 28 is formed from a rubbery composition which is relatively resistant to attack by hydrocarbon gases and oils. Examples of such resistant rubbery compositions which are suitable for use are Neoprene (polychloroprene) and butadiene-acrylonitrile copolymers, such as those known commercially by the trade designations Buna-N or GR-A. The gasket, however, is not limited to these specific materials for use in coupling 15, and particularly when special resistance to gases and oils is not required, any rubbery composition having the above-specified characteristics may be employed.

The gasket 28 is compressed and urged into sealing engagement between the pipe 16 and the middle ring 18 by means of a gasket-compressing member or "follower nut" 30 which is provided with internal threads for engagement with the threads 26 of the middle ring. As shown in Fig. 1, the exterior surface of follower nut 30 is shaped to provide a wrench section to which may be readily applied a wrench for rotating the nut relatively to middle ring 18, and end wall 32 of the follower nut is formed with an aperture 33 having an inwardly-directed, outwardly-tapered frusto-conical surface 35 which provides a cam surface, the purpose of which will be fully described hereinafter. In order to confine and protect the gasket 28 and to prevent frictional resistance by the gasket when the follower nut 30 is rotated in tightening or loosening the coupling, there is provided a gasket "retainer" 42. In the embodiment illustrated in Figs. 1 and 2, the gasket retainer 42 has the form of a substantially cup-shaped annular member which is conveniently stamped or otherwise formed by conventional means from a metal sheet. Retainer 42 has a radially-extending body portion 44 which is formed with an aperture 45, of lesser diameter than the central aperture 33 of the follower nut 30, and which merges with an axially-extending peripheral flange portion 47 which is dimensioned to be received in the annular space between the interior wall of the follower nut and the cylindrical surface 24 of the sleeve 18. When the follower nut 30 is tightened, the retainer 42 is urged axially inwardly and axially compresses the gasket 28 in the gasket recess 20, thereby causing the gasket to expand radially inwardly into tight sealing engagement with the pipe section 16.

When the follower nut 30 is tightened, as above described and as shown at the right in Figs. 1 and 2, there may in some cases be a tendency for the gasket 28 to be extruded into the interior of middle ring 18. In order to avoid possible damage to the gasket by such extrusion, there is advantageously provided at the inner end of the toe portion 31 of gasket 28 an expansible metallic ring 48, as shown in Fig. 2. Expansible ring 48 is conveniently in the form of an annular spring helix which is molded into the rubber composition of the gasket by known rubber processing and molding techniques. The endless helix comprising the ring 48 is preferably imbedded in the gasket 28 so as to be substantially flush with the inner face of the gasket and also with the tapered outer surface of the toe portion 31. When the gasket is compressed by the action of follower nut 30, and the retainer 42, the expansible ring is forced between the face of the gasket recess 20 and the surface of pipe section 16 and thus effectively closes the annular aperture defined between these adjacent surfaces.

In accordance with the invention, the desired locking of the coupling with respect to the pipe without interference with the full sealing action of the gasket is provided by the action of a locking ring 50, which is seated in the central aperture 33 of the follower nut 30 and is adapted to grip the pipe and to follow the axial movements of the pipe. As will be seen in Figs. 1, 2 and 3, the locking ring 50 has a serrated inner surface 54, a tapered outer surface 56, an inner radial face or end 58 and an outer radial face or end 59, the outer surface 56 being of substantially the same slope as the wall 35 of follower nut aperture 33. The surfaces 54 and 56 preferably form an angle of approximately five to fifteen degrees to the axis of the pipe, the angle shown in the drawings being about 10°. At its outer radial end 59 the locking ring 50 is formed with a flange or extension 60 which projects radially outwardly. The flange 60 is of sufficient radial height to prevent inward passage of the locking ring through the central aperture 33 of the follower nut 30 even when the coupling is positioned on "minimum" pipe of the nominal pipe size for which the coupling is constructed.

It is well-known that the outside diameter of commercial pipes of any given size vary from what may be termed the "nominal" size, some pipe having a diameter greater than the nominal size and some having a lesser diameter. Thus, for each given "nominal" pipe size, the outside diameters of commercial pipes vary from what may be termed "minimum" pipe to what may be called "maximum" pipe. If pipe couplings are to be of general utility, this variation in pipe size must be taken into account. This variation has been at least partly responsible for some of the difficulties encountered in the use of many of the locking couplings heretofore proposed.

It is a feature of the invention that the lock coupling is of such construction that it is effectively used with maximum pipe, minimum pipe or pipe of nominal size. Regardless of the variation from nominal size, an effective, strong, thrust-resistant, fluid-tight connection between the pipe sections is obtained with facility. In all cases the gasket is brought smoothly into sealing engagement, and the locking ring firmly locks the pipe in the coupling without in any way adversely affecting the sealing action of the gasket.

In constructing the coupling, the pipe apertures 22, the retainers 42 and the follower nuts 30 are all formed of sufficient size and with apertures of sufficient diameter to receive the maximum pipe of the specified nominal size, the apertures of the follower nuts also being of sufficient size to receive the main body of the locking rings 50 but, as previously indicated, the flanges 60 of the locking rings prevent full entry of the locking rings into the follower nut apertures. The locking rings 50 are resilient and of such diameter that they will grip the pipe with spring tension even though the pipe is of minimum size. The outer end of each locking ring is internally bevelled, as indicated at 61, to facilitate stabbing the pipe into the coupling.

As shown in Figs. 3, 4 and 5, the locking ring is advantageously split as indicated at 64 so that its diameter can be varied to conform to the external diameter of the pipe with which it is associated. The serrations of the inner surface 54 may be in the form of threads or they may be parallel grooves, but in any case their edges should be sharp. The locking ring may, however, take various forms, i. e. it may be the split ring 50, or it may be a compressible and expansible continuous ring, or it may be a discontinuous ring and engage only selected portions of the outer surface of the pipe. In all cases, however, the ring has a sloping outer surface and a serrated inner surface for engagement with the surface of the pipe to be locked.

Furthermore, the flange or radial extension on the locking ring may be continuous, i. e. it may extend continuously around the outer face of the locking ring, or it may be discontinuous. As shown in Fig. 5, for example, the locking ring 65 illustrated is a split ring similar to ring 50 of Figs. 3 and 4 but the continuous flange 60 of ring 50 is replaced by a plurality of spaced radial projections 66. In the embodiment illustrated in Fig. 5, these projections are five in number but it will be apparent that this number may be varied without departing from the invention. Referring to Figs. 6 to 10, there are shown further illustrative embodiments of locking rings suitable for use in accordance with the invention. As shown more particularly in Figs. 6 and 7, the locking ring may be annular in form and comprise a continuous ring 72 formed with a sloping outer peripheral surface 73 and a serrated inner surface 74 to provide a substantially trapezoidal cross-section with an outer end face 75 and an inner end face 76, the former being provided with a radial extension 77. The outer end of the ring is internally bevelled as indicated at 71. The ring 72 is articulated by means of axial slots extending inwardly from each end face in order to permit the ring to be readily conformed to the outer surface of both minimum and maximum pipe. Ring 72 is thus provided with slots 78 extending inwardly from its outer end face 75, and slots 79 extending inwardly from its inner end face 76. Slots 78 and 79 are staggered with relation to one another to divide the integral central portion of ring 72 to provide a substantially regular zig-zag configuration, as may be seen in Fig. 7. The slots 78 and 79 are shown as extending approximately five-sixths through the ring 72 but the depth of the slots may be varied. Ordinarily, however, they should extend at least two-thirds through the ring. Ring 72 for any given nominal pipe size is made with an internal diameter slightly smaller than the diameter of minimum pipe of the given nominal size, and the slots 78 and 79 permit the ring to be expanded to receive nominal pipe or maximum pipe.

Instead of being in the form of a continuous ring, such as ring 72, or a split ring, such as ring 50, the locking ring may comprise a plurality of individual, spaced ring segments interconnected in ring form by suitable elastic connecting and spacing means. Referring to Figs. 8 to 10, for example, locking ring 80 illustrated is formed from a plurality of ring segments 81, each of substantially trapezoidal cross-section with a flange or extension 82 at their outer ends and having substantially trapezoidal faces interconnected into a ring by an extensible cord element 83. Cord element 83 passes through apertures 84 in segments 81 and may be a continuous helical coil or spring or may be formed from rubber or other elastic material. Fig. 10 shows an alternative method of interconnecting the segments. Segment 85 of Fig. 10 is formed with a transverse trapezoidal slot 86 in which is received a band or ring of similar cross-section and formed from rubber or other elastic composition. It will be seen that the elastic connecting means permit the ring to expand to receive the pipe and, when the coupling is tightened, permit the ring segments to be moved radially inwardly into locking engagement with the outer surface of the pipe with which the coupling is associated.

Moreover, while the locking rings shown in the drawings have been referred to as having a serrated inner pipe-engaging surface, the term "serrated" is intended to include as well a knurled surface, or other like friction-increasing surface.

It will be understood that the invention is not limited to a coupling for two pipes of the same nominal diameter but may also be embodied in a reducing coupling, in a T coupling, or other coupling fitting.

The coupling of the invention is advantageously completely assembled at the time of manufacture and is thus conveniently shipped and installed with minimum effort. The gaskets and the retainers are seated in each follower nut, and the locking rings are loosely engaged in each follower nut aperture. The follower nuts are then loosely engaged with the external threads of the middle ring. When the coupling is applied, the pipe sections to be joined are merely "stabbed" into each open end of the coupling. Before tightening the follower nuts, the locking rings are pushed inwardly toward the center of the coupling sleeve until the radial flanges engage the outer end faces of the follower nuts. This automatically positions the locking rings for proper operation. The follower nuts are then tightened upon the middle ring by means of a wrench or the like and as each follower nut is tightened upon the middle ring, the gasket is compressed into sealing engagement with the pipe. Since the locking rings grip the pipe with spring tension, the locking rings become wedged between the pipe and the tapered cam surfaces 35 of the follower nuts as the gasket is compressed. While jamming is prevented, the locking rings are at all times in locking engagement with the pipe and any outward movement of the pipe after the coupling has been installed is prevented. Such outward movement tends to force the locking rings further into the aperture in the follower nuts, and the tapered cam surface 35 of each follower nut cooperates with the tapered outer surface of the associated locking ring to force it inwardly into still firmer frictional engagement with the pipe.

There is thus provided an effective lock against longitudinal separation of the pipe sections joined by the coupling with simultaneous fluid-tight sealing of the joint. A coupling constructed in accordance with the invention is suitable for use in connecting the sections of vertical pipe lines, such as those in wells and the like, permitting the proper assembly of such lines rapidly and easily without need for special tools or skilled labor, and providing a securely-jointed line having fluid-tight, flexible joints which take up any vibrational or bending stresses to which the line may be subjected in service.

While the invention has been illustrated and described with reference to certain preferred embodiments thereof, it will be obvious that various changes and modifications in addition to those above mentioned may be made without departing from the scope of the invention as defined in the appended claim. It will further be understood that, insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

What I claim and desire to secure by Letters Patent is:

A pipe coupling comprising a tubular sleeve having an externally-threaded end and providing an internal gasket recess, a gasket positioned in said recess, a follower nut threadedly engageable with said sleeve to compress said gasket radially inwardly, cup-shaped gasket retainer means disposed between the wall of the follower nut and the gasket to permit rotation of the nut without frictional engagement with the gasket, said nut having an end wall defining a central pipe aperture having an inwardly-diverging taper toward the axial center of said sleeve in the axially outward direction thereof and said retainer having an end wall defining a pipe aperture of smaller diameter than the smallest diameter of said nut aperture, and a radially-inwardly compressible locking ring of substantially trapezoidal axial cross-section extending into said nut aperture, the outer periphery of said ring having substantially the same slope as that of the aperture for frictional engagement therewith and the inner periphery of said ring being formed with a serrated, pipe-engaging surface, said ring having a first end of a given radial thickness and a second end of lesser radial thickness than said first end axially-outwardly thereof with the outside diameter of said second end being greater than the diameter of said aperture at its axially-outer end, and said ring having at its second end a flange means extending radially from at least two diametrically opposite sides of the radially outer periphery of said second end for limiting entry of said ring into said aperture, the axial length of the central pipe aperture being at least as great as the axial dimension of the locking ring between the flange and its axially-inner first end, said follower nut end wall undergoing axial movement when said nut is tightened on said sleeve to compress said gasket independently of the movements of said locking ring.

References Cited in the file of this patent

UNITED STATES PATENTS

| | | |
|---|---|---|
| 2,059,920 | Weatherhead | Nov. 3, 1936 |
| 2,313,323 | Cowles | Mar. 9, 1943 |
| 2,508,914 | Graham | May 23, 1950 |
| 2,585,453 | Gallagher | Feb. 12, 1952 |
| 2,610,078 | Risley | Sept. 9, 1952 |

FOREIGN PATENTS

| | | |
|---|---|---|
| 729,164 | Germany | Dec. 10, 1942 |